(12) United States Patent
Chen et al.

(10) Patent No.: US 7,666,388 B2
(45) Date of Patent: *Feb. 23, 2010

(54) MULTI-METAL-NITROGEN COMPOUNDS FOR USE IN HYDROGEN STORAGE MATERIALS

(75) Inventors: Ping Chen, Singapore (CN); Zhitao Xiong, Singapore (CN)

(73) Assignee: National University of Singapore, Cresent (SG)

( * ) Notice: Subject to any disclaimer, the term of this patent is extended or adjusted under 35 U.S.C. 154(b) by 342 days.

This patent is subject to a terminal disclaimer.

(21) Appl. No.: 10/574,212

(22) PCT Filed: Sep. 24, 2004

(86) PCT No.: PCT/SG2004/000317

§ 371 (c)(1),
(2), (4) Date: Nov. 14, 2006

(87) PCT Pub. No.: WO2005/030637

PCT Pub. Date: Apr. 7, 2005

(65) Prior Publication Data

US 2007/0116623 A1    May 24, 2007

Related U.S. Application Data

(60) Provisional application No. 60/507,548, filed on Oct. 2, 2003, provisional application No. 60/571,804, filed on May 17, 2004.

(51) Int. Cl.
*C01B 3/08* (2006.01)
*C01B 6/06* (2006.01)
*C01B 21/06* (2006.01)

(52) U.S. Cl. ............. 423/658.2; 502/526; 423/646
(58) Field of Classification Search ............. 96/108; 95/116; 423/248, 648.1, 658.1, 646; 502/56, 502/526; 206/0.7; 420/900
See application file for complete search history.

(56) References Cited

U.S. PATENT DOCUMENTS

| | | | |
|---|---|---|---|
| 6,814,782 B2 | 11/2004 | Bogdanović et al. | |
| 6,946,112 B2 * | 9/2005 | Chen et al. | 423/645 |
| 6,967,012 B2 * | 11/2005 | Meisner et al. | 423/413 |
| 2003/0129126 A1 | 7/2003 | Chen et al. | |
| 2004/0265226 A1 * | 12/2004 | Meisner et al. | 423/658.2 |
| 2005/0047994 A1 * | 3/2005 | Meisner et al. | 423/658.2 |
| 2005/0191236 A1 * | 9/2005 | Pinkerton et al. | 423/658.2 |
| 2005/0271581 A1 * | 12/2005 | Meyer et al. | 423/658.2 |

FOREIGN PATENT DOCUMENTS

| WO | WO 03/018468 A1 | 3/2003 |
|---|---|---|
| WO | WO 03/050036 A1 | 6/2003 |

OTHER PUBLICATIONS

International Search Report and Written Opinion mailed Dec. 20, 2004, for PCT Patent Application PCT/SG2004/000317, filed on Sep. 29, 2004, 3 pages.

* cited by examiner

*Primary Examiner*—Frank M Lawrence
(74) *Attorney, Agent, or Firm*—Morrison & Foerster LLP

(57) ABSTRACT

There is disclosed a multi-metal-nitrogen compound for use in hydrogen storage materials. The compound comprising two dissimilar metal atoms and a nitrogen atom. The multi-metal-nitrogen compound being capable of absorbing hydrogen at an absorption temperature and pressure, and of desorbing 60% or more by weight of said absorbed hydrogen at a desorption temperature and pressure.

24 Claims, 8 Drawing Sheets

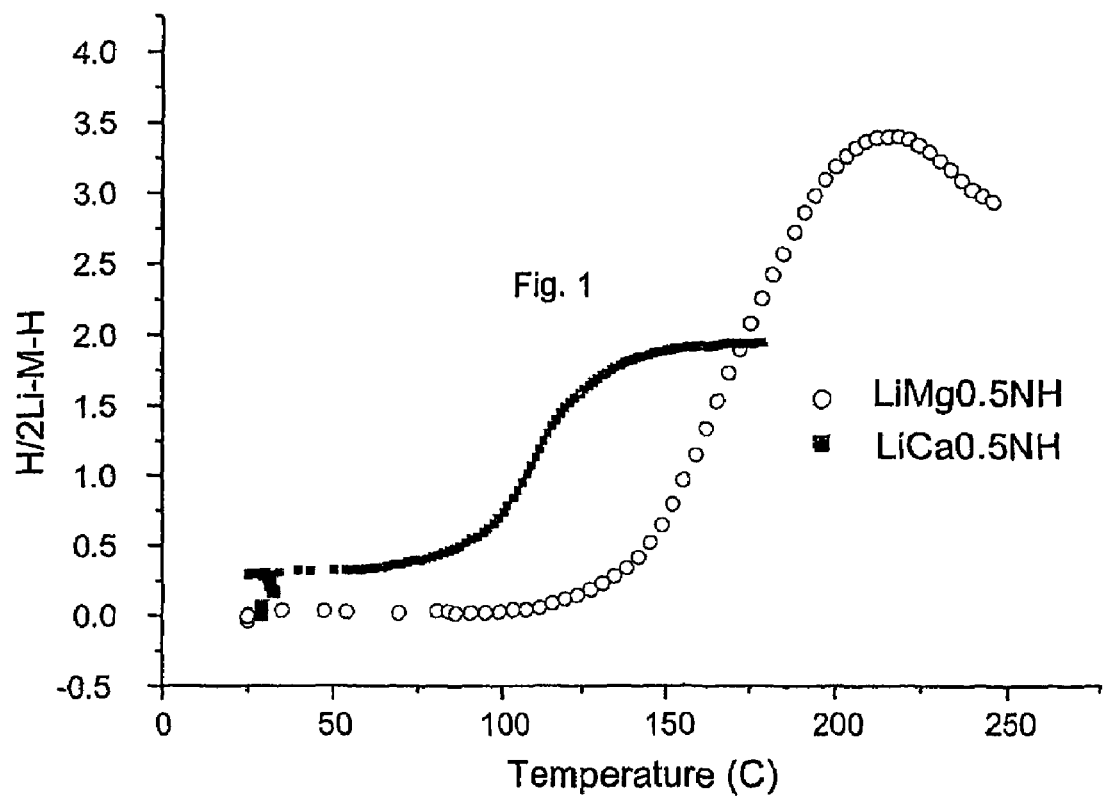

MULTI-METAL-NITROGEN COMPOUNDS FOR USE IN HYDROGEN STORAGE MATERIALS

TECHNICAL FIELD

The present invention generally relates to compounds for use in hydrogen storage materials.

BACKGROUND

Hydrogen-based energy is one of the cleanest of the currently known energy sources, and it will undoubtedly play a part in the energy supply of this century. Heavy environmental pollution due to combustion of fossil fuel and depletion of non-renewable energy sources emerge as two serious problems.

Hydrogen-based energy sources are considered to be the most promising candidates for solving these problems, as this kind of energy can replace fossil fuel in most applications. The biggest challenge in on-board hydrogen utilisation (i. e. as fuel for vehicle, portable computer, phone, etc.) is the low hydrogen storage capacity that existing systems possess. Development of hydrogen storage media is of great importance.

Currently, there are four systems for hydrogen storage [1,2]: Liquid hydrogen, Compressed hydrogen gas, Cryo-adsorption systems, and Metal hydride systems.

Applications of hydrogen in pure form (liquid hydrogen or compressed hydrogen gas) are mostly utilised for large-scale or stationary purposes, since the weight of containers for hydrogen is normally too prohibitive for uses where hydrogen is used in limited scope. For vehicular or any other portable applications, hydrogen stored in solid-state materials seems to be the best solution. Thus, cryo-adsorption systems and metal hydride systems are the two most promising systems.

The cryo-adsorption systems show advantages in moderate weight and volume. In this system, hydrogen molecules are physically bound to the surface of activated carbon at liquid nitrogen temperature. Under optimised conditions, the hydrogen storage capacity of activated carbon may reach 7 wt % based on the weight of activated carbon. The disadvantages of this system relate to the critical conditions required (i.e. cryogenic conditions).

Metal hydrides have been proposed as systems for hydrogen storage. Hydrogen is chemisorbed by metal or metal alloys with corresponding formation of metal hydrides. Two categories of metal alloys have been extensively explored: I) $AB_5$ type, and ii) $A_2B$ type. $LaNi_5$ is a good example of the first category. One molecule of $LaNi_5$ can absorb about 6 hydrogen atoms at ambient temperature and high pressures to form $LaNi_5H_6$. Subsequent discharge of hydrogen can be achieved by reducing the hydrogen pressure. In this system, the hydrogen storage capacity is less than 1.5 wt %. The advantages of this type of metal alloy lie in the quick kinetics of hydrogen charge/discharge and the very good density of the materials, but the hydrogen storage capacity is unacceptable. $Mg_2Ni$ illustrates the $A_2B$ type of metal alloy. This kind of metal alloy can store more than 4 wt % of hydrogen, but suffers from higher operating temperature (above 300° C. for desorption, with an equilibrium hydrogen pressure of up to 100 kPa (1.0 bar), slow hydrogen charge and discharge kinetics and relatively low density. More recently, much effort has been made on material engineering of these metal alloys [3, 4], but no significant improvement has been made. Furthermore, the high cost of the metal alloys is another drawback.

Additionally, although some compounds are known to absorb hydrogen at relatively low temperatures and pressures, the subsequent desorption of hydrogen may be relatively low under such conditions. This means that the compounds have low reverse absorption capacity which either makes them unsuitable or inefficient for use as hydrogen storage materials.

There is a need to provide compounds for use in hydrogen storage materials that overcome, or at least ameliorate, one or more of the disadvantages described above.

There is a need to provide compounds for use in hydrogen storage materials are capable of reversibly absorbing hydrogen at relatively low temperatures and pressures.

There is a need to provide compounds for use in hydrogen storage materials that provide improved capacity for reversibly absorbing hydrogen.

SUMMARY

A first aspect of the invention provides a multi-metal-nitrogen compound for use in hydrogen storage materials, the compound comprising at least two dissimilar metal atoms and a nitrogen atom, the multi-metal-nitrogen compound being capable of absorbing hydrogen at an absorption temperature and pressure, and of desorbing 60% or more by weight of said absorbed hydrogen at a desorption temperature and pressure.

A second aspect of the invention provides a multi-metal-nitrogen compound for use in hydrogen storage materials, the compound comprising at least two dissimilar metal atoms and a nitrogen atom, the multi-metal-nitrogen compound being capable of absorbing hydrogen in the range of about 1% to about 12% by weight at a temperature of 220° C. or less, and of desorbing 60% or more by weight of said absorbed hydrogen at a temperature of 220° C. or less.

A third aspect of the invention provides a hydrogen reservoir containing a multi-metal-nitrogen compound comprising at least two dissimilar metal atoms and a nitrogen atom, the multi-metal-nitrogen compound being capable of, at a temperature of 220° C. or less, absorbing hydrogen at an absorption pressure, and of desorbing 60% or more by weight of said absorbed hydrogen at a desorption pressure.

A fourth aspect of the invention provides a bimetal-nitrogen compound for use in hydrogen storage materials, the compound comprising two dissimilar metal atoms selected from the group consisting of aluminium, calcium, lithium, magnesium, and sodium, and mixtures thereof, and a nitrogen atom, the bimetal-nitrogen compound being capable of, at a temperature of 200° C. or less, absorbing hydrogen at an absorption pressure, and of desorbing 60% or more by weight of said absorbed hydrogen at a desorption pressure.

A fifth aspect of the invention provides a process for reverse adsorbing hydrogen comprising:

providing a multi-metal-nitrogen compound comprising at least two dissimilar metal atoms and a nitrogen atom, the multi-metal-nitrogen compound being capable of absorbing hydrogen at an absorption temperature and pressure, and of desorbing 60% or more by weight of said absorbed hydrogen at a desorption temperature and pressure;

contacting the multi-metal-nitrogen compound with hydrogen at the absorption temperature and pressure; and releasing hydrogen from the multi-metal-nitrogen compound at the desorption temperature and pressure.

A sixth aspect of the invention provides a process for making a multi-metal-nitrogen compound for use in a multi-metal-nitrogen compound for use in hydrogen storage materials, the compound comprising the step of heating a mixture of a metal hydride and a metal nitride, the metal hydride comprising at least one metal, the metal-nitrogen compound comprising at least one metal that is dissimilar to said at least one metal of said metal hydride, at a temperature and a pressure to form the multi-metal-nitrogen compound, the dissimilar metals being selected such that the multi-metal-nitrogen compound is capable of absorbing hydrogen at an absorption temperature and pressure, and of desorbing 60% or more by weight of said absorbed hydrogen at a desorption temperature and pressure.

A seventh aspect of the invention provides a use of a mutli-metal-nitrogen compound for storing hydrogen, the mutli-metal-nitrogen compound comprising at least two dissimilar metal atoms and a nitrogen atom, the multi-metal-nitrogen compound being capable of absorbing hydrogen at an absorption temperature and pressure, and of desorbing 70% or more by weight of said absorbed hydrogen at a desorption temperature and pressure.

DEFINITIONS

The following words and terms used herein shall have the meaning indicated:

The term "compound" and grammatical variations thereof is given a broad meaning, such as the result formed by a union of elements or parts especially, but not exclusively, a distinct substance formed by chemical union of two or more ingredients in definite proportion by weight. The term compound may also refer to an admixture of a metal hydride and a metal-nitrogen-based compound that can lead to physical mixtures of new compounds, both of which are effective for the absorption and desorption of hydrogen.

The terms "multi-metal", "multi-metal compound" and grammatical variations thereof, means, unless otherwise qualified to the contrary, a compound formed of two or more dissimilar metal atoms.

The term 'multi-metal-nitrogen compound' and grammatical variations thereof, means a compound that includes at least two dissimilar metal atoms and at least one nitrogen atom. The at least two metal atoms and the nitrogen atom may, or may not be, bonded to each other or to atoms of other elements.

The term 'metal-nitrogen compound' and grammatical variations thereof, means a compound that includes a metal atom and at least one nitrogen atom. The metal atom and the nitrogen atom may, or may not be, bonded to each other or to atoms of other elements.

The terms "absorb" "absorption", "absorbed" is not necessarily used in the strict scientific sense, as hydrogen may be held by absorption, in a strict sense, by adsorption, in a strict sense, by chemisorption, in a strict sense, or by the combination of two or three of these mechanisms.

The terms "reversibly absorb", "reversibly absorbing", "reverse absorption", and grammatical variations thereof, means a quantity of hydrogen that is absorbed by the multi-metal-nitrogen compound at an absorption temperature and pressure which subsequently undergoes desorption from the multi-metal-nitrogen compound at a desorption temperature and pressure.

The term "sorbent" refers to a material or compound capable of exhibiting absorption or adsorption of hydrogen gas.

As used herein the term "comprising" means "including principally, but not necessarily solely". Variations of the word "comprising", such as "comprise" and "comprises", have correspondingly varied meanings.

As used herein, the term "about", in the context of concentrations of components of the formulations, typically means ±5% of the stated value, more typically ±4% of the stated value, more typically ±3% of the stated value, more typically, ±2% of the stated value, even more typically ±1% of the stated value, and even more typically ±0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DISCLOSURE OF EMBODIMENTS

Exemplary, non-limiting embodiments of multi-metal-nitrogen compounds for use in hydrogen storage materials or a hydrogen reservoir, will now be disclosed.

Surprisingly, multi-metal-nitrogen compounds disclosed herein exhibit remarkable hydrogen storage capacity at lower temperatures and/or pressures than known compounds and can therefore be used as hydrogen storage materials. This non-cryogenic hydrogen storage is reversible, so the multi-metal-nitrogen compounds can be used in materials for hydrogen storage. Advantageously, the disclosed multi-metal-nitrogen compounds are capable of desorbing 60% or more of absorbed hydrogen.

Of the factors that govern the suitable conditions for absorption and desorption, temperature and hydrogen pressure are important. In the disclose compounds, at lower temperatures, hydrogen absorption and desorption can be efficiently carried out under lower hydrogen pressure. At higher temperatures, the overall pressure for hydrogen absorption and desorption will increase. In either case, most of the hydrogen can be desorbed (released) from the material when a vacuum is applied.

In a disclosed method to absorb hydrogen, the material comprising the multi-metal-nitrogen compounds may be exposed to a hydrogen-containing atmosphere, which may be free of contaminants, particularly oxygen.

In one embodiment, the multi-metal-nitrogen compound may be a bimetal compound. In another embodiment, the bimetal compound may have two metals selected from the group consisting of Group IA, Group IIA, Group IIIB, Group IVA and Group VIII of the Periodic Table of elements, and mixtures thereof, the two metals being selected such that, at a temperature of 200° C. or less, the bimetal compound is capable of absorbing hydrogen at an absorption pressure, and of desorbing at least 70% of said absorbed hydrogen at a desorption pressure. In another embodiment, the two metals may be selected from the group consisting of aluminium (Al), calcium (Ca), lithium (Li), magnesium (Mg), and sodium (Na).

In one embodiment, there is provided a bimetal-nitrogen compound for use in hydrogen storage materials, the compound comprising a nitrogen atom and a pair of metal atoms selected from the group consisting of lithium(Li)-aluminium (Al), lithium(Li)-magnesium(Mg), lithium(Li)-calcium(Ca), magnesium(Mg)-calcium(Ca), magnesium(Mg)-sodium (Na), magnesium(Mg)-aluminium(Al), and mixtures thereof, the bimetal-nitrogen compound being capable of, at a temperature of 220° C. or less, absorbing hydrogen at an absorption pressure, and of desorbing 60% or more by weight of said absorbed hydrogen at a desorption pressure.

The nitrogen atom may be bonded to one or two hydrogen atoms.

In one embodiment, one of the metals is bonded to a hydrogen atom while the other metal is bonded to the nitrogen atom.

In one embodiment, the absorption temperature and the desorption temperature may be in the range selected from the group consisting of: about −100° C. to about 220° C.; −75° C. to about 190° C.; −50° C. to about 190° C.; about −25° C. to about 200° C.; about 0° C. to about 200° C.; about −25° C. to about 180° C.; about 0° C. to about 180° C.; about 20° C. to about 180° C.; about 30° C. to about 180° C.; about 40° C. to about 180° C.; about 50° C. to about 180° C.; about 60° C. to about 180° C.; about 70° C. to about 180° C.; about 80° C. to about 180° C.; about 90° C. to about 180° C.; about 100° C. to about 180° C.; about 40° C. to about 170° C.; about 40° C. to about 160° C.; about 40° C. to about 150° C.; about 40° C. to about 140° C.; about 40° C. to about 130° C.; about 40° C. to about 120° C.; about 50° C. to about 120° C.; about 50° C. to about 110° C.; about 50° C. to about 100° C.; about 60° C. to about 120° C.; about 60° C. to about 110° C.; and about 60° C. to about 90° C.

In one embodiment, the absorption pressure may be in the range selected from the group consisting of: about 1 KPa to about 30 MPa; about 100 KPa to about 20 MPa; about 500 KPa to about 15 MPa; about 750 KPa to about 15 MPa; about 1 MPa to about 15 MPa; about 1 MPa to about 12 MPa; about 1 MPa to about 10 MPa; 2 MPa to about 8 MPa; and 3 MPa to about 7 MPa.

In one embodiment, the desorption pressure may be in the range selected from the group consisting of: about 0.1 KPa to about 10 MPa; about 1 KPa to about 10 MPa; about 10 KPa to about 10 MPa; about 10 KPa to about 1 MPa; about 10 KPa to about 500 KPa; about 10 KPa to about 250 KPa; and about 10 KPa to about 100 KPa.

In one embodiment, the quantity of hydrogen that is capable of being reversibly absorbed by the multi-metal-nitrogen compound, by weight percentage, may be 65% or more, or 70% or more, or 75% or more, or 80% or more, or 85% or more, or 90% or more. In one embodiment, the quantity of hydrogen that is capable of being reversibly absorbed by the multi-metal-nitrogen compound, by weight percentage, may be within the range selected from the group consisting of: about 60% to about 99%; about 65% to about 99%; about 70% to about 99%; about 75% to about 99%; about 80% to about 98%; about 85% to about 98%; and about 90% to about 95%.

In one embodiment, the total quantity of hydrogen that is capable of being absorbed by the multi-metal-nitrogen compound, by weight percentage, may be within the range selected from the group consisting of: about 1% to about 12%; about 1% to about 11%; about 1% to about 10%; about 1% to about 9%; about 1% to about 8%; about 1% to about 7%; about 1% to about 6%; about 1% to about 5%; about 1% to about 4%; about 1% to about 3%; about 1% to about 2%; about 2% to about 12%; about 3% to about 12%; about 4% to about 12%; about 5% to about 12%; about 6% to about 12%; about 7% to about 12%; about 8% to about 12%; about 9% to about 12%; about 10% to about 12%; and about 11% to about 12%.

A mass of the multi-metal-nitrogen compounds may used as a sorbent of hydrogen. Desorption may be assisted by passage over the sorbent of a stream of an inert gas, for example argon.

The multi-metal-nitrogen compound may be a multi-metal nitride, multi-metal hydride-nitride, multi-metal imide, multi-metal hydride-imide or multi-metal amide. The hydrogen storage material may comprise a mixture of multi-metal nitride, multi-metal imide, and multi-metal amide compounds. The multi-metal hydride-nitride may be binary, ternary or higher metal hydride-nitrides. The multi-metal hydride-imide may be binary, ternary or multinary metal hydride-imide. The multi-metal nitrides may be binary, ternary or higher metal nitrides. The multi-metal imides may be binary, ternary or multinary metal imides. The multi-metal amides may be binary, ternary or multinary metal amides.

In one embodiment, a bimetal may be provided that comprises lithium and another metal selected from the group consisting of aluminium, calcium and magnesium. In one embodiment, the bimetal-nitrogen compound may be a lithium-aluminium nitride, lithium-aluminium imide, lithium-aluminium amide, lithium hydride-aluminium nitride, lithium hydride-aluminium imide, lithium hydride-aluminium amide and mixtures thereof. The bimetal-nitrogen compounds of the hydrogen reservoir, may have an overall composition represented by the general formula:

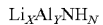

where $0<X<3$, $0<Y<1$ and $N \geq |3-X-3Y|$.

In one embodiment, the bimetal compound of formula $Li_xAl_yNH_N$ may be capable of absorbing hydrogen at a temperature at or lower than 220° C.

In one embodiment, the bimetal-nitrogen compound may be a lithium-magnesium nitride, lithium-magnesium imide, lithium-magnesium amide, lithium-calcium nitride, lithium-calcium imide, lithium-calcium amide, lithium hydride-magnesium nitride, lithium hydride-magnesium imide, lithium hydride-magnesium amide, lithium hydride-calcium nitride, lithium hydride-calcium imide, lithium hydride-calcium amide and mixtures thereof. The bimetal-nitrogen compounds of the hydrogen reservoir, may have an overall composition represented by the general formula:

or

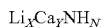

where $0<X<3$, $0<Y<1.5$ and $N \geq |3-X-2Y|$.

In one embodiment, the bimetal compound of formula $Li_xMg_yNH_N$ may be capable of absorbing hydrogen at a temperature at or lower than 220° C. The bimetal-nitrogen compound of formula $Li_xMg_yNH_N$ may be capable of absorbing about 0.5% wt to about 7.5% wt hydrogen at a temperature in the range of about 100° C. to about 220° C. The bimetal-nitrogen compound of formula $Li_xMg_yNH_N$ may be capable of reversibly absorbing about 80% to 95% by weight hydrogen.

In one embodiment, the bimetal compound of formula $Li_xCa_yNH_N$ may be capable of absorbing hydrogen at a temperature at or lower than 200° C. The bimetal compound of formula $Li_xCa_yNH_N$ may be capable of absorbing about 0.5% wt to about 4% wt hydrogen at a temperature in the range of about 25° C. to about 150° C. The bimetal-nitrogen compound of formula $Li_xCa_yNH_N$ may be capable of reversibly absorbing about 80% to 95% by weight hydrogen.

In one embodiment, the multi-metal-nitrogen compound may comprise magnesium and another metal selected from the group consisting of aluminium, calcium and sodium.

In one embodiment, the multi-metal-nitrogen compound may be a bimetal-nitrogen selected form the group consisting of magnesium-calcium nitride, magnesium-calcium imide, magnesium-calcium amide, magnesium hydride-calcium nitride, magnesium hydride-calcium imide, magnesium hydride-calcium amide, and mixtures thereof. The bimetal-nitrogen compounds of the hydrogen reservoir, may have an overall composition represented by the general formula:

$$Mg_XCa_YNH_N$$

where $0<X<1.5$, $0<Y<1.5$, and $N \geq |3-2x-2y|$.

In one embodiment, the bimetal-nitrogen compound of formula $Mg_XCa_YNH_N$ may be capable of absorbing hydrogen at a temperature at or lower than 200° C. The bimetal compound of formula $Mg_XCa_YNH_N$ may be capable of absorbing about 0.5% wt to about 4% wt hydrogen at a temperature in the range of about 25° C. to about 180° C. The bimetal-nitrogen compound of formula $Mg_XCa_YNH_N$ may be capable of reversibly absorbing about 70% to 85% by weight hydrogen.

In one embodiment, the bimetal-nitrogen compound may be a magnesium-sodium nitride, magnesium-sodium imide, magnesium-sodium amide, magnesium hydride-sodium nitride, magnesium hydride-sodium imide, magnesium hydride-sodium amide and mixtures thereof. The bimetal-nitrogen compounds of the hydrogen reservoir, may have an overall composition represented by the general formula:

$$Mg_XNa_YNH_N$$

where $0<X<1.5$, $0<Y<1.5$, and $N \geq |3-2x-2y|$.

In one embodiment, the bimetal-nitrogen compound of formula $Mg_XNa_YNH_N$ may be capable of absorbing hydrogen at a temperature at or lower than 200° C. The bimetal compound of formula $Mg_XNa_YNH_N$ may be capable of absorbing about 0.5% wt to about 4% wt hydrogen at a temperature in the range of about 25° C. to about 180° C. The bimetal-nitrogen compound of formula $Mg_XNa_YNH_N$ may be capable of reversibly absorbing about 85% to 97% by weight hydrogen.

In one embodiment, the bimetal-nitrogen compound may be a magnesium-aluminium nitride, magnesium-aluminium imide, magnesium-aluminium amide, magnesium hydride-aluminium nitride, magnesium hydride-aluminium imide, magnesium hydride-aluminium amide and mixtures thereof. The bimetal-nitrogen compounds of the hydrogen storage material, may have an overall composition represented by the general formula:

$$Mg_XAl_YNH_N$$

where $0<X<1.5$, $0<Y<1.5$, and $N \geq |3-2x-2y|$.

A mass of the multi-metal-nitrogen compounds may be provided to form a sorbent for absorbing hydrogen. The sorbent may be in the form of a powder and may have a mean particle size in the range selected from the group consisting of: 0.1 μm to 100 μm, 0.5 μm to 500 μm, 1 μm to 250 μm, 1 μm to 150 μm, and 1 μm to 100 μm.

BRIEF DESCRIPTION OF DRAWINGS

The accompanying drawings illustrate disclosed embodiments and serve to explain the principles of the disclosed embodiments. It is to be understood, however, that the drawings are designed for purposes of illustration only, and not as a definition of the limits of the invention.

FIG. 1 displays data showing the amount of hydrogen absorbed with temperature by two sorbents comprised of multi-metal-nitrogen compounds respectively having an overall formula of $LiMg_{0.5}NH$ (open circles) and $Li_2CaN_2H_2$ (black squares). The Y axis represents the molar ratio of H to the sorbent at a pressure of 4000 kPa (40 bars) of hydrogen and the X axis represents temperature in degrees centigrade.

DETAILED DESCRIPTION OF DISCLOSED EMBODIMENTS

Preparation of Metal Nitrides

Figure 1A:
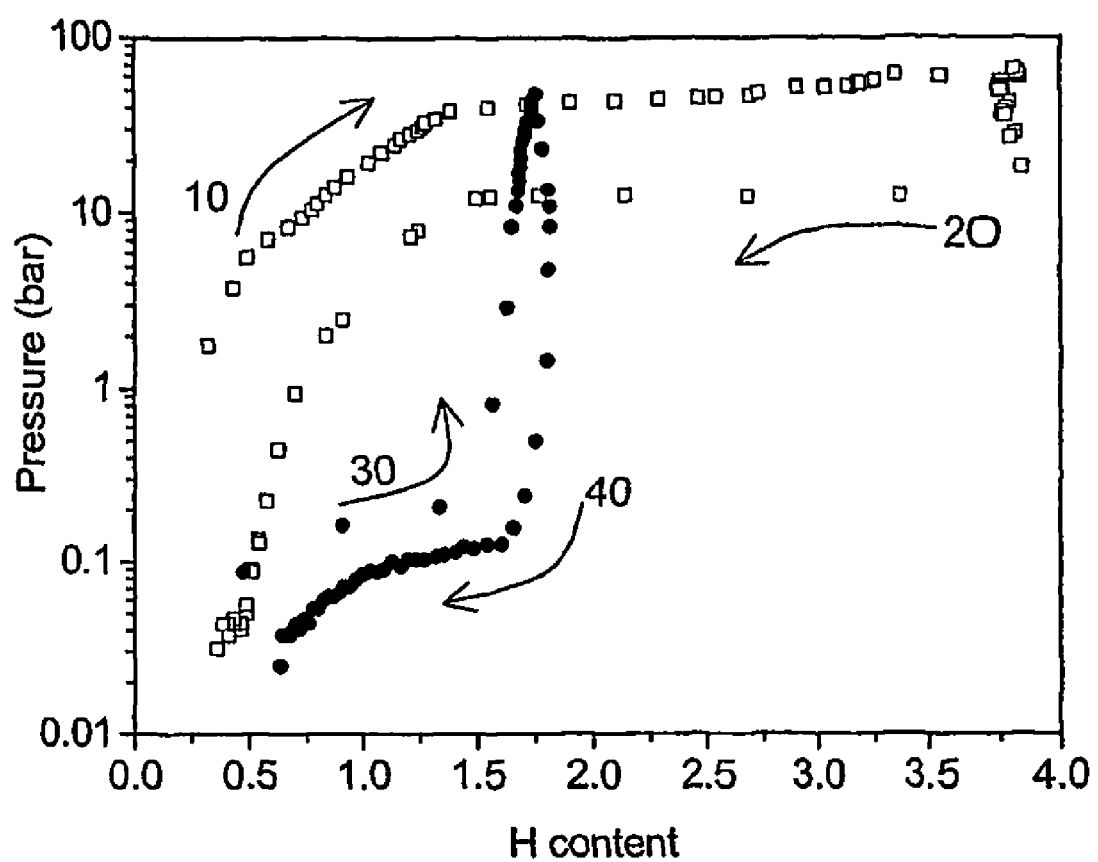
FIG. 1A displays Pressure-Composition-Isotherms (PCI) of data showing the amount of absorption and subsequent desorption of hydrogen with pressure. The sorbent having an overall formula of $LiMg_{0.5}NH$ (open squares) was at a temperature of 180° C. The sorbent having an overall formula of $LiCa_{0.5}NH_2$ (black circles) was at a temperature of 220° C. The Y axis represents pressure in bar and the X axis represents the ratio of absorbed H to sorbent.

Nitrides can be synthesised by direct reaction between a metal and nitrogen gas [5]. Any two or more metals that will combine with a nitrogen-containing moiety to form a compound that will reversibly absorb at least 70% hydrogen can be used. At least two dissimilar metals are selected from an alkali metal (e.g. lithium (Li) or sodium (Na)), an alkaline earth metal (e.g. magnesium (Mg) or calcium (Ca)), a Group IIIb metal (e.g. aluminium (Al)), or a Group VIII metal.

Preparation of Bimetal Nitrides

Ball-Milling

A bimetal-nitrogen compound is made by ball milling a mixture of a metal hydride and a metal nitride, metal imide or a metal amide. The metal of the metal nitride, metal imide or metal amide being different from the metal of the metal hydride. The mixture that has been subjected to ball milling is then heated either under vacuum or in the presence of an inert gas at temperatures ranging from 25° C. to 1500° C., under gas pressure of from 1 kPa (0.1 bar) to 50 MPa (500 bar) until no gas evolves from the mixture. Calcination In an alternative method of preparing bimetal-nitrogen compounds, a mixture of two dissimilar metals, or of their compounds, are calcined under a nitrogen atmosphere at temperatures ranging from room temperature to 1500° C., under gas pressure of from 1 kPa (0.1 bar) to 50 MPa (500 bar). Calcination can also be carried out by heating a mixture of a metal, or of its compounds, and a metal nitride, metal imide or metal amide under an inert gas or nitrogen atmosphere at temperatures ranging from room temperature to 1500° C., under gas pressure of from 1 kPa (0.1 bar) to 50 MPa (500 bar). The metal, or of its compounds, that reacts with the metal nitride, metal imide or metal amide acts as a "dopant metal". The dopant metal can be provided in the form of compounds for example halides, oxide, nitrides, organometallic compounds etc.

Hydrogen Storage in Li—Ca.NH

The overall composition of a Li—Ca.NH compound, may be described according to the following formula:

$$Li_XCa_YNH_N$$

where $0<X<3$, $0<Y<1.5$ and $N \geq |3-X-2Y|$.

A sample of $LiCa_{0.5}NH$ prepared and the absorption of hydrogen was investigated by Temperature-Programmed-Reaction (TPR). Diluted hydrogen gas (20% $H_2$+80% Ar, the partial pressure of $H_2$ is around 4 MPa (40 bars)) was passed through a $LiCa_{0.5}NH$ sample having a mean particle size of a 1 μm at elevated temperatures. On-line Gas Chromatography (GC) and Mass Spectrometry (MS) were used to monitor the change of hydrogen content in the effluent gas during the test. FIG. 1 displays the TPR test results. It can be seen that hydrogen absorption by $LiCa_{0.5}NH$ begins at a temperature of about 25° C. and increases at temperatures above 100° C. Hydrogen absorption peaks at 150° C., in which the H to $LiCa_{0.5}NH$ ratio is about 0.87, which is equivalent to about 2.03 wt % H stored in $LiCa_{0.5}NH$.

Without being bound by theory, it thought from the data obtained by TPR that the reaction path is:

$$2LiCa_{0.5}NH + 2H_2 \rightarrow CaH_2 + 2LiNH_2 \qquad (1)$$

With the $LiCa_{0.5}NH$ converting to $CaH_2$ and $LiNH_2$. The Pressure-Composition-Isotherm measurements shown in FIG. 1A confirm this prediction. The horizontal axis (X) refers to the molar ratio of absorbed H atom to sorbent. In FIG. 1A, the closed circles squares represent the $LiCa_{0.5}NH$ sorbent. The arrow 30 represents the absorption isotherm of $LiCa_{0.5}NH$ and the arrow 40 represents the desorption isotherm.

From FIG. 1A, it can be seen that X can reach up to 1.75 at temperature of about 220° C., which is equivalent to about 2.03 wt % of $H_2$. As contamination is difficult to avoid, contaminants (for example lithium oxide and hydroxide) may occupy a certain amount of the sample weight, thus X can be less than 1.0.

The reverse of the reaction of equation (1), i.e. the desorption of hydrogen from $CaH_2$ and $2LiNH_2$, can be achieved by decomposition of the material at a temperature from about 80° C. to about 220° C. at a hydrogen pressure of 1 KPa (0.01 bar) to 10 MPa (100 bar).

As tested by Temperature-Programmed-Desorption (TPD) (shown in line c of FIG. 2), hydrogen desorption begins at a temperature of around 175° C. and peaks at 220° C. The desorbed hydrogen may be described according to the following reaction:

$$CaH_2 + 2LiNH_2 \rightarrow 2LiCa_{0.5}NH + 2H_2 \qquad (2)$$

In situ X-ray Diffraction (XRD) was used to measure the phase transition during hydrogen absorption and desorption process of a $LiCa_{0.5}NH$ sample. As shown in line I of FIG. 7a, which shows the XRD of the sample before hydrogen absorption, only strong diffraction peaks assigned to $LiCa_{0.5}NH$ and weak peaks at about 37.3° and about 53.7° are due to CaO. As hydrogen absorption began, the $LiMg_{0.5}NH$ phase at about 32° became weakened and finally vanished and the amide and hydride phases situated at approximately 30.5°, 51°, 38°, and 44°, respectively, developed.

Figure 7:
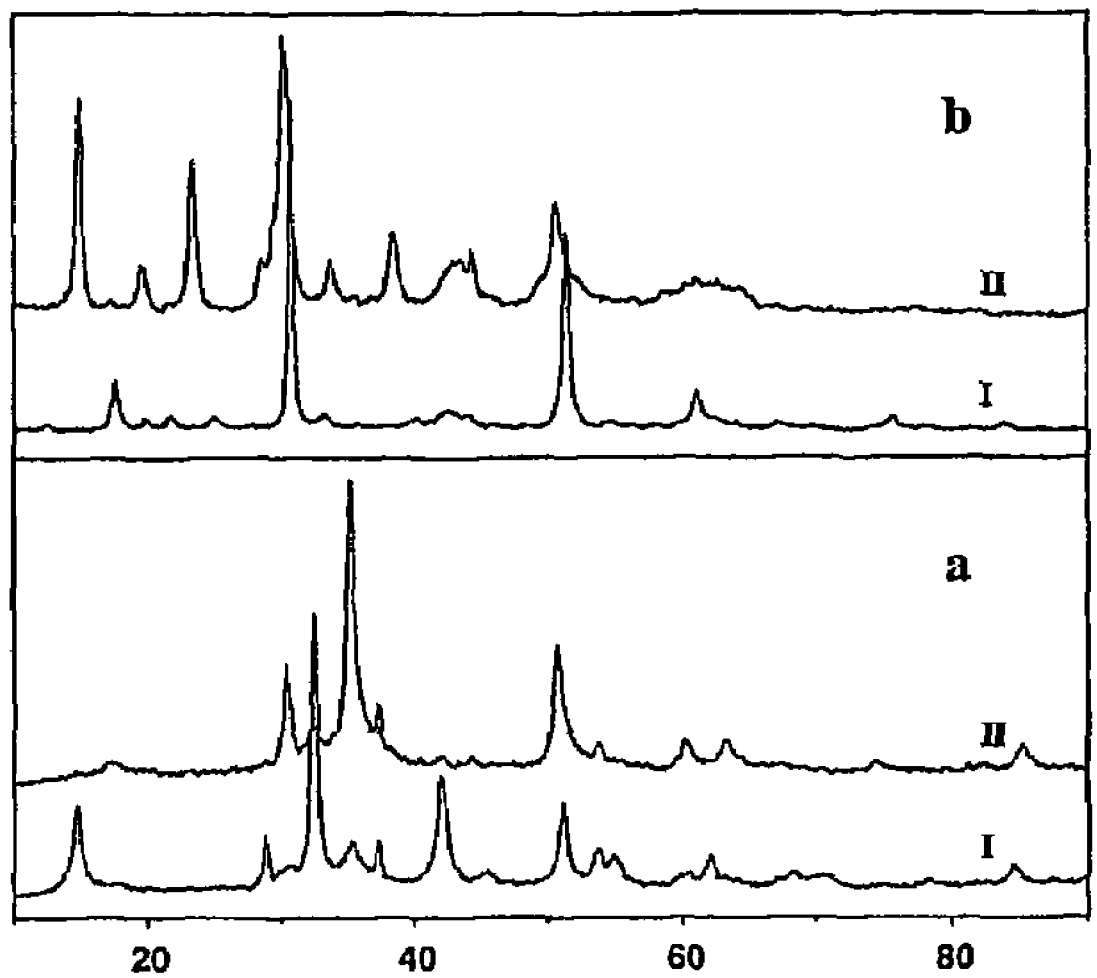
FIG. 7 shows the X-ray Diffraction (XRD) of a $LiCa_{0.5}NH$ sample and the X-ray Diffraction (XRD) of a $LiMg_{0.5}NG$ sample disclosed below.

It can be seen from the XRD diffraction patterns of FIG. 7a before (I) and after (II) hydrogen absorption, that the hydrogenated sample is composed of $CaH_2$ and $LiNH_2$.

Hydrogen Storage in Li—Mg.NH

The overall composition of a Li—Mg.NH compound, may be described according to the following formula:

$$Li_XMg_YNH_N$$

where $0<X<3$, $0<Y<1.5$ and $N \geq |3-X-2Y|$.

The hydrogen absorption of $LiMg_{0.5}NH$ was investigated by Temperature-Programmed-Reaction (TPR). Diluted hydrogen gas (20% $H_2$+80% Ar, the partial pressure of $H_2$ is around 4 MPa (40 bars)) was passed through $LiMg_{0.5}NH$ sample having a mean particle size of a 1 μm at elevated temperatures. On-line Gas Chromatography (GC) and Mass Spectrometry (MS) were used to monitor the change of hydrogen content in the effluent gas during the test. FIG. 1 displays the TPR test results. It can be seen that hydrogen absorption by $LiMg_{0.5}NH$ begins at a temperature of about 90° C. and increases at temperatures above 120° C. Hydrogen absorption peaks at 220° C., in which the hydrogen content reaches 4.95 wt % and the decreases at temperatures above 230° C.

Without being bound by theory, it thought from the data obtained by TPR that the reaction path is:

$$2LiMg_{0.5}NH + 2H_2 \rightarrow Mg(NH_2)_2 + 2LiH \qquad (3)$$

With the $LiMg_{0.5}NH$ converting to $Mg(NH_2)_2$ and LiH, about a 1.7 molar ratio of H to $LiMg_{0.5}NH$ can be stored, which is equal to about 4.95 wt % of hydrogen that can be stored in $LiMg_{0.5}NH$. The Pressure-Composition-Isotherm measurements shown in FIG. 1A confirm this prediction. The horizontal axis (X) refers to the molar ratio of absorbed H atom to sorbent. In FIG. 1A, the open squares represent the $LiMg_{0.5}NH$ sorbent. The arrow 10 represents the absorption isotherm and the arrow 20 represents the desorption isotherm.

From FIG. 1A, it can be seen that X could reach up to 3.4 at temperature of about 220° C., which is equivalent to about 4.95 wt % of $H_2$. As contamination is difficult to avoid, contaminants (for example lithium oxide and hydroxide) may occupy a certain amount of the sample weight, thus X can be less than 2.0.

The reverse of the reaction of equation (3), i.e. the desorption of hydrogen from $Mg(NH_2)_2$ and LiH, can be achieved by decomposition of the material at a temperature from about 80° C. to about 220° C. at a hydrogen pressure of 10 KPa (0.1 bar) to 10 MPa (100 bar). As tested by Temperature-Programmed-Desorption (TPD) (shown in line b of FIG. 2), hydrogen desorption begins at a temperature of around 140° C. and peaks at 170° C. There is a shoulder at 185° C. The desorbed hydrogen may be described according to the following reaction:

$$Mg(NH_2)_2 + 2LiH \rightarrow 2LiMg_{0.5}NH + 2H_2 \qquad (4)$$

In situ X-ray Diffraction (XRD) was used to measure the phase transition during hydrogen absorption and desorption process of a $LiMg_{0.5}NH$ sample. As shown in line I of FIG.

7b, before hydrogen absorption, only strong diffraction peaks assigned to LiMg$_{0.5}$NH and broad peaks at about 42.3° and about 61° are due to MgO. As hydrogen absorption began, the LiMg$_{0.5}$NH phase became weakened and finally vanished and the amide and hydride phases situated at approximately 30.5°, 51°, 38°, and 44°, respectively, developed.

It can be seen from the XRD diffraction patterns of FIG. 7b before (I) and after (II) hydrogen absorption, that the hydrogenated sample is composed of Mg(NH$_2$)$_2$ and LiH.

Figure 2:
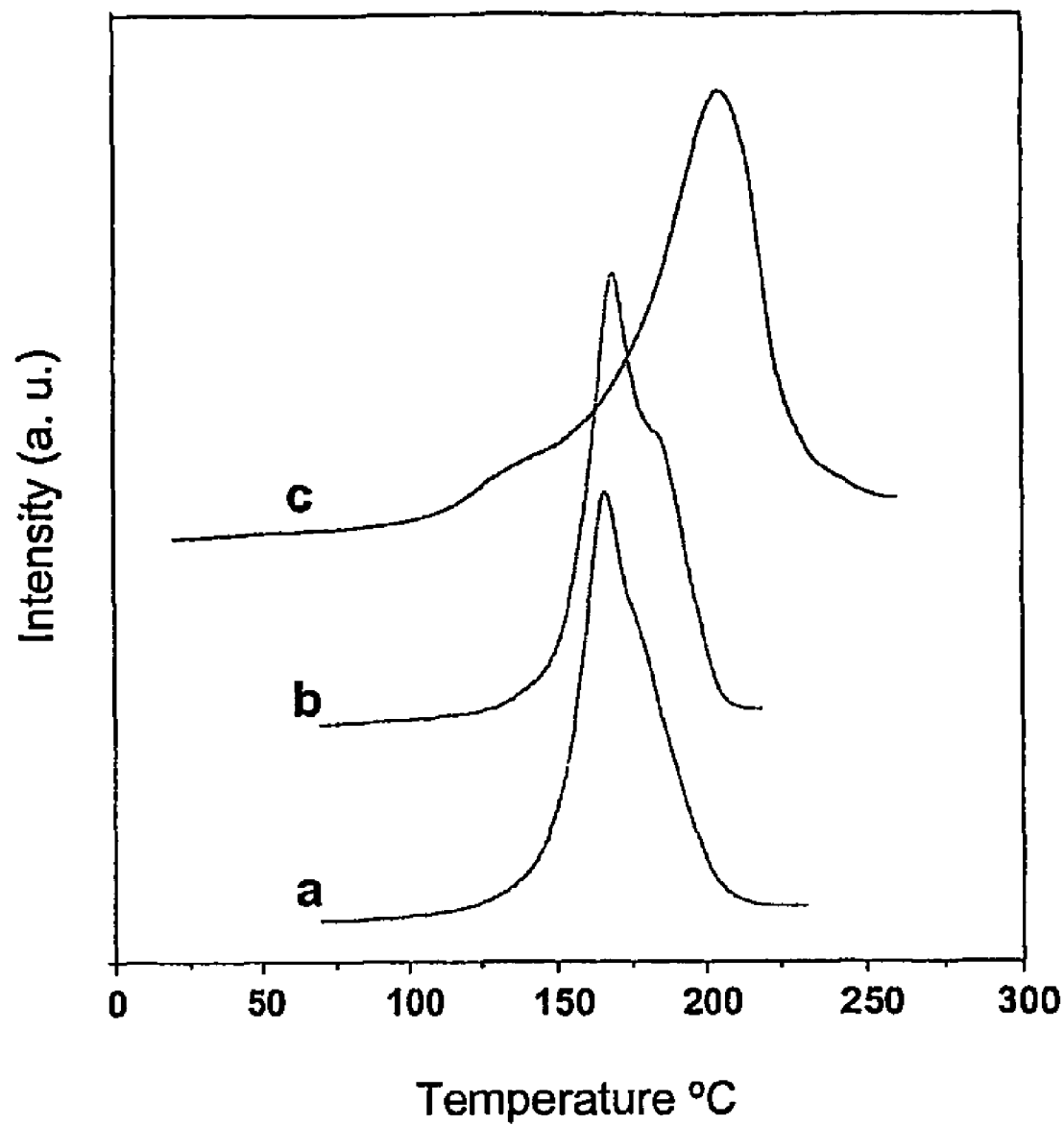
FIG. 2 describes Temperature-Programmed-Desorption (TPD) of sorbents having the following overall formula:(a) Hydrogenated $LiMg_{0.67}NH_{0.67}$; (b) hydrogenated $LiMg_{0.5}NH$; and (c) hydrogenated $LiCa_{0.5}NH$. Absorption conditions: Hydrogen pressure 10 MPa (100 bar), time 1 hour. The desorption was detected by heating the above samples in a gas stream of purified Ar. A Mass Spectrometer was used to detect the effluent gases.
Figure 3:
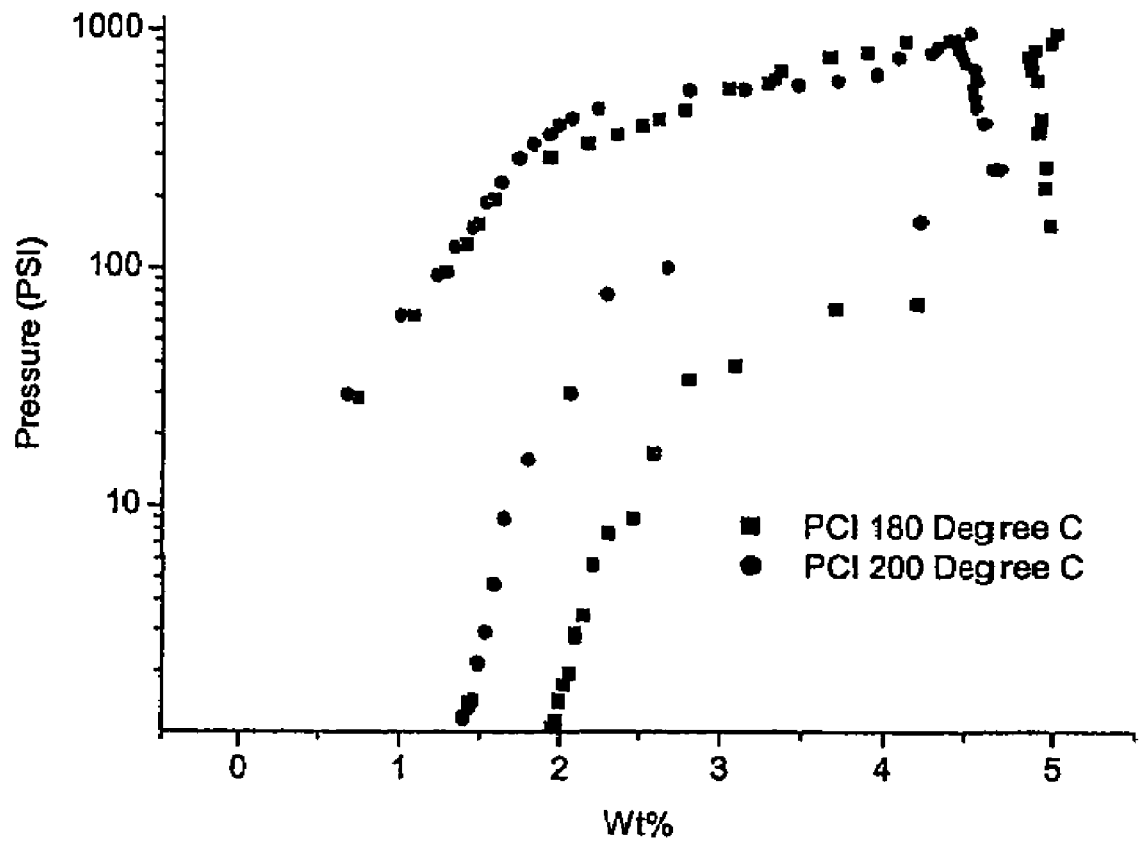
FIG. 3 shows pressure-composition-temperature (P-C-T) profiles of a sorbent having the overall formula $Li_2Mg_{0.5}NH$ at temperatures of: (a) 180° C. (closed squares) and (b) 200° C. (closed circles). The X-axis represents wt % of H absorbed in the sample and the Y-axis is pressure.

The desorption from a sample having the overall composition LiMg$_{0.67}$NH$_{0.67}$ was also tested. Referring to FIG. 2, line a, the desorption of hydrogen from Mg(NH$_2$)$_2$ and LiH, closely mirrors the desorption isotherm of LiMg$_{0.5}$NH. Hydrogen desorption begins at a temperature of around 150° C. and peaks at 170° C.

Hydrogen Storage in Mg—Na.NH

The overall composition of a Li—Mg.NH compound, may be described according to the following formula:

$$Mg_XNa_YNH_N$$

where 0<X<1.5, 0<Y<1.5, and N≧|3-2x-2y|.

Figure 4:
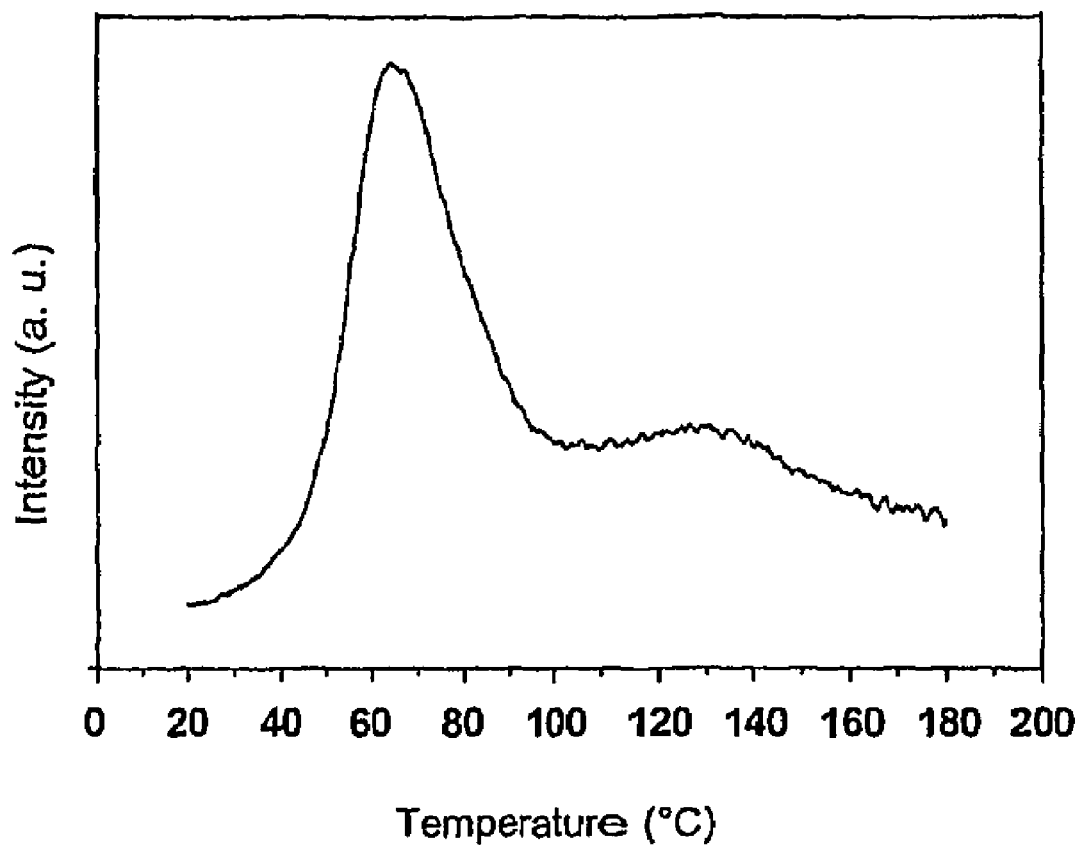
FIG. 4 displays the amount of hydrogen absorbed by a sample having an overall composition $Mg_{0.5}Na_{0.5}NH_{1.25}$ with temperature. The Y axis represents the molar ratio of H to the sorbent at a pressure of 200 MPa (20 bars) of hydrogen. The X axis represents temperature in degrees centigrade.

The hydrogen absorption of Mg$_{0.5}$Na$_{0.5}$NH was investigated by Temperature-Programmed-Reaction (TPR). Diluted hydrogen gas (20% H$_2$+80% Ar, the partial pressure of H$_2$ is around 4 MPa (40 bars)) was passed through Mg$_{0.5}$Na$_{0.5}$NH sample having a mean particle size of a 1 μm at elevated temperatures. On-line Gas Chromatography (GC) and Mass Spectrometry (MS) were used to monitor the change of hydrogen content in the effluent gas during the test. FIG. 4 displays the TPR test results. It can be seen that hydrogen absorption by Mg$_{0.5}$Na$_{0.5}$NH begins at a temperature of about 25° C. and increases at temperatures above 50° C. Hydrogen absorption peaks at 60° C., in which the hydrogen content reaches 1.0 wt % and the decreases at temperatures above 70° C.

Figure 5:
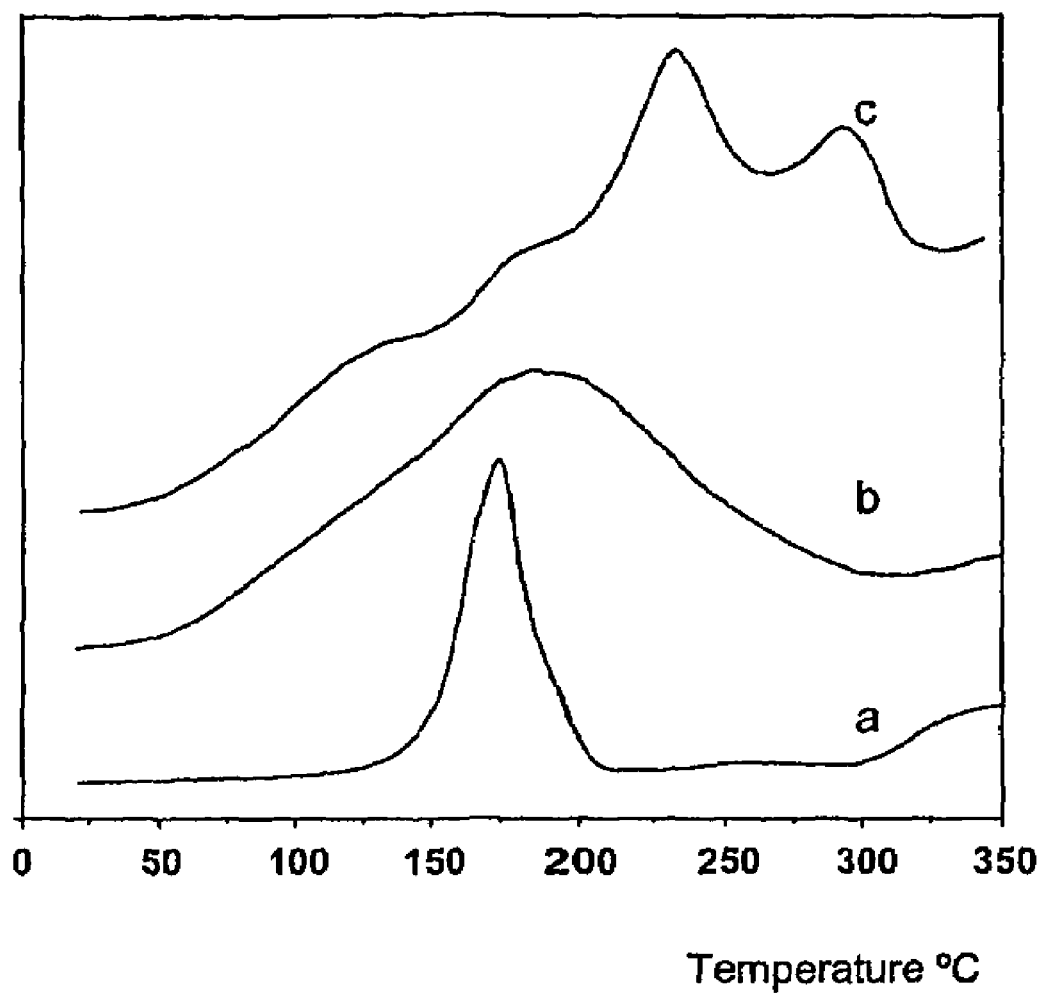
FIG. 5 describes Temperature-Programmed-Desorption (TPD) of (a) Hydrogenated $Mg_{0.5}Na_{0.75}NH_{0.5}$ complex; (b) hydrogenated $Mg_{0.5}Ca_{0.5}NH$; and (c) hydrogenated $Mg_{0.5}Al_{0.5}NH_{0.5}$. Absorption conditions: Hydrogen pressure 10 MPa (100 bar), time 1 hour. The desorption was detected by heating the above samples in a gas stream of purified Ar. A Mass Spectrometer was used to detect the effluent gases.

The desorption of a sample having the overall formula Mg$_{0.5}$Na$_{0.75}$NH$_{0.5}$ was also studied and is shown by the TPD shown in line a of FIG. 5. Hydrogen desorption from Mg$_{0.5}$Na$_{0.75}$NH$_{0.5}$ begins at a temperature of around 150° C. and peaks at about 175° C. and stops desorbing at a temperature of about 200° C.

Figure 6:
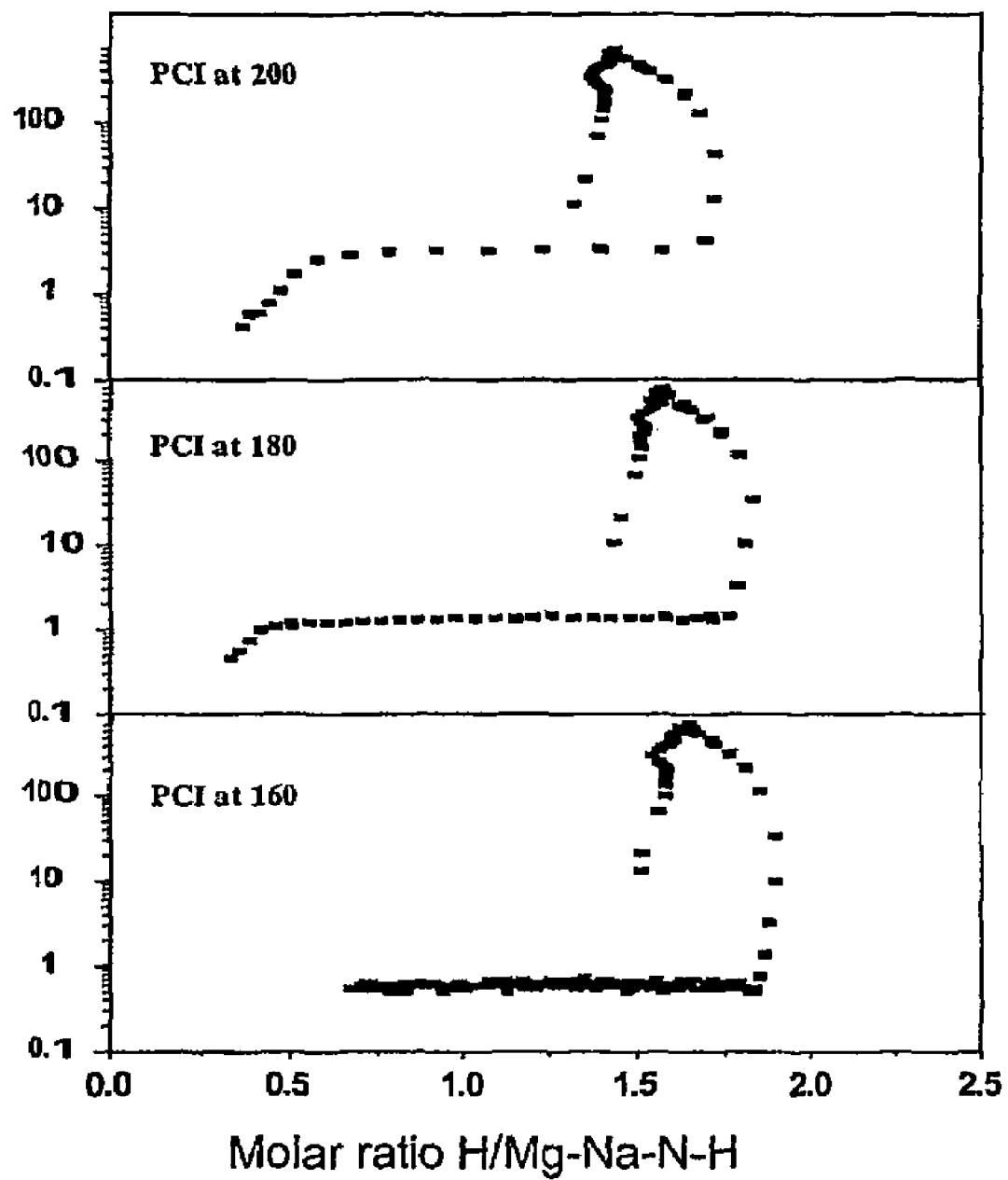
FIG. 6 shows P-C-I profiles of a $Mg_{0.5}NaNH_4$ sample at temperatures of: (a) 160° C., (b) 180° C. and (c) 200° C. X axis represents molar ratio of absorbed H to $Mg_{0.5}NaNH_4$, Y is pressure.

Referring to FIG. 6, there is shown Pressure-Composition-Isotherms (P-C-I) profiles of a Mg$_{0.5}$NaN sample at temperatures of: (a) 160° C., (b) 180° C. and (c) 200° C. It can be seen from FIG. 6 that the maximum ratio of absorbed H to MgNa$_2$N$_2$H (or 2 molecules of Mg$_{0.5}$NaNH) was about 1.9, which is equivalent to about 1.9 wt %.

Hydrogen Storage & Desorption in Mg—Ca.NH

The overall composition of a Mg—Ca—NH compound, may be described according to the following formula:

$$Mg_XCa_YNH_N$$

where 0<X<1.5, 0<Y<1.5 and N≧|3-2x-2y|.

As will be described in Example 6, below, a sample of Mg$_{0.5}$Ca$_{0.5}$NH was able to absorb up to 1.3% wt H at a temperature of 40° C. and a pressure of 20 MPa (200 bar).

The desorption of the sample of Mg$_{0.5}$Ca$_{0.5}$NH was also studied and is shown by the TPD shown in line b of FIG. 5. It will be seen from the figure that hydrogen desorption from Mg$_{0.5}$Ca$_{0.5}$NH occurs over a broad range of temperatures. Hydrogen desorption from Mg$_{0.5}$Ca$_{0.5}$NH begins at a temperature of around 50° C. and peaks at about 190° C. and stops desorbing at a temperature of about 300° C.

Hydrogen Storage & Desorption in Mg—Al.NH

The overall composition of a Mg—Ca.NH compound, may be described according to the following formula:

$$Mg_XAl_YNH_N$$

where 0<X<1.5, 0<Y<1.5 and N≧|3-2x-2y|.

The desorption of a sample having the overall composition Mg$_{0.5}$Al$_{0.5}$NH is shown by the TPD shown in line c of FIG. 5. It will be seen from the figure that hydrogen desorption from Mg$_{0.5}$Al$_{0.5}$NH beings at a temperature of 50° C. and continues desorbing to a peak temperature of about 220° C.

Hydrogen Releasing Materials

Disclosed herein are compositions comprising at least one metal hydride and a metal nitride capable of desorbing hydrogen at relatively low temperatures and pressures. It is expected that these compositions may be used as an additive in a hydrogen reservoir to assist in the desorption of hydrogen gas. Disclosed herein are a number of examples of compositions capable of releasing hydrogen at relatively low temperatures:

In a first example, a 2.0 g mixture of Mg(NH$_2$)$_2$ and MgH$_2$ with molar ratio of 1:1 was ball milled at 25° C. for two hours at atmospheric pressure. It was surprisingly found that 2 wt % of hydrogen was released from the mixture during the milling period.

In a second example, a 3.0 g mixture of LiNH$_2$ and LiAlH$_4$ with in a LiNH$_2$:LiAlH$_4$ molar ratio of 2:1 was ball milled for 20 hours at atmospheric pressure. It was surprisingly found that 3 wt % of hydrogen was released from the mixture during the milling period.

In a third example, a 1.0 g mixture of Mg(NH$_2$)$_2$ and NaH in a molar ratio of Mg(NH$_2$)$_2$:NaH equalling 1:1 was heated to 160° C. under an inert gas atmosphere at atmospheric pressure. It was surprisingly found that 2 wt % of hydrogen was released from the mixture during the milling period.

Hydrogen Reservoirs

The hydrogen sorbents described above can be used in any circumstances where hydrogen supply is needed. A preferred application of the sorbents is in hydrogen reservoirs.

Applications for these reservoirs are numerous, for example, as on-board hydrogen storage in hydrogen-energy-driven automobiles, ships, aircraft, missiles etc. Another possible application for the sorbents is in a hydrogen fuel cell where, for example, the sorbents described above can supply the hydrogen. In addition, the hydrogen absorption and desorption reactions described above can be used to transport energy.

A hydrogen reservoir may comprise a container that contains the sorbent used in the invention. The container may bear one or more ports that permit the ingress of hydrogen during hydrogen absorption and that permit the egress of hydrogen during hydrogen desorption. The container can also use a single port with a reversible valve to permit both the ingress and the egress of the hydrogen. A person skilled in the art would have the knowledge and training suitable to design containers for use as hydrogen reservoirs.

EXAMPLE 1

MgH$_2$ can be purchased commercially. LiNH$_2$ and Li$_2$NH can be synthesized by reacting Li with ammonia gas NH$_3$.

2.0 grams of LiNH$_2$, Li$_2$NH and MgH$_2$ with molar ratio of 1:1:1 was mixed thoroughly by a planetary ball mill for 2 days. The as-prepared mixture was then heated in a vacuum (1 kPa (0.01 bar)) to 250° C. until no gas evolved from the mixture. A ternary imide was formed having the overall composition given by the formula $Li_{1.5}Mg_{0.5}NH_{0.5}$. Without being bound by theory, it is thought that some of the reactants had formed a complex while some of the reactants had not reacted but had remained in admixture form.

A 500 mg sample of $Li_{1.5}Mg_{0.5}NH_{0.5}$ having a mean particle size of was put into the sample cell of a Pressure-Composition-Isotherm (PCI) unit. The hydrogen storage capacity was determined by introducing 10 MPa (100 bar) of hydrogen into the sample cell, which was preheated to 180° C. After 2 hours of absorption, about 4.5 wt % of hydrogen was absorbed.

Desorption was performed by evacuating the PCI system to 10 kPa (0.1 bar) at a temperature of 180° C. for 3 hours. The amount of desorbed hydrogen was measured by re-absorption of hydrogen at 180° C. and under 10 MPa (100 bar) of hydrogen for 2 hour. 4.1 wt % of hydrogen was re-absorbed, which means that about 90 wt % of hydrogen was desorbed at 180° C.

Accordingly, the sorbent of formula $Li_{1.5}Mg_{0.5}NH_{0.5}$ was surprisingly found to be capable of reverse absorbing 90 wt % of the absorbed hydrogen. The sorbent of formula $Li_{1.5}Mg_{0.5}NH_{0.5}$ was surprisingly capable of absorbing and desorbing hydrogen at relatively low temperatures of about 180° C.

EXAMPLE 2

450 mg sample of $LiMg_{0.5}NH$ was put into the sample cell of a Pressure-Composition-Isotherm (PCI) unit. The hydrogen storage capacity was determined by introducing 20 MPa (200 bar) of hydrogen into the sample cell, which was preheated to 180° C. After 3 hours of absorption, about 5.5 wt % of hydrogen was absorbed.

Desorption was performed by evacuating the PCI system to 10 kPa (0.1 bar) at a temperature of 180° C. for 3 hours. The amount of desorbed hydrogen was measured by re-absorption of hydrogen at 180° C. and under 20 MPa (200 bar) of hydrogen for 3 hours. About 5.1 wt % of hydrogen was re-absorbed, which means that about 93 wt % of hydrogen was desorbed at 180° C.

Accordingly, the $LiMg_{0.5}NH$ sorbent of formula $Li_{1.5}Mg_{0.5}NH_{0.5}$ was surprisingly found to be capable of reverse absorbing 93 wt % of the absorbed hydrogen. The sorbent of formula $Li_{1.5}Mg_{0.5}NH_{0.5}$ was surprisingly capable of absorbing and desorbing a high quantity of hydrogen at relatively low temperatures of about 180° C.

EXAMPLE 3

$MgH_2$ can be purchased commercially. $Li_2NH$ can be synthesized by reacting Li with ammonia gas $NH_3$.

1.0 gram of $Li_2NH$ and $MgH_2$ with molar ratio of 1:0.3125 was mixed and pretreated following the procedure described in Example 1 to produce a ternary sorbent having the overall general formula of $Li_2Mg_{0.625}NH_{0.25}$. Without being bound by theory, it is thought that some of the reactants had formed a complex while some of the reactants had not reacted but had remained in admixture form.

500 mg of the $Li_2Mg_{0.625}NH_{0.25}$ sorbent was put into the sample cell of a Pressure-Composition-Isotherm (PCI) unit. The hydrogen storage capacity was determined by introducing 10 MPa (100 bar) of hydrogen into the sample cell, which was preheated to 200° C. After 5 hours of absorption, about 3.5 wt % of hydrogen was absorbed.

Desorption was performed by evacuating the PCI system to 10 kPa (0.1 bar) at a temperature of 200° C. for 5 hours. The amount of desorbed hydrogen was measured by re-absorption of hydrogen at 200° C. and under 10 MPa (100 bar) of hydrogen for 5 hours. About 3.32 wt % of hydrogen was re-absorbed, which means that about 95 wt % of hydrogen was desorbed at 200° C.

Accordingly, the $Li_2Mg_{0.625}NH_{0.25}$ sorbent was surprisingly found to be capable of reverse absorbing 95 wt % of the absorbed hydrogen. The sorbent of formula $Li_{1.5}Mg_{0.5}NH_{0.5}$ was surprisingly capable of absorbing and desorbing a high quantity of hydrogen at relatively low temperatures of about 200° C.

EXAMPLE 4

$CaH_2$ can be purchased commercially. $LiNH_2$ can be synthesized by reacting Li with ammonia gas $NH_3$.

500 mg of $LiNH_2$ and $CaH_2$ mixture with in a $LiNH_2$:$CaH_2$ molar ratio of 2:1 was ball milled for 5 hours. Accordingly, in this example, the Li:Ca:N ratio was 2:1:2. The mixture was pretreated to 250° C. under vacuum. The material was exposed to hydrogen atmosphere 5 MPa (50 bar) at 150° C. in a PCI unit as described in example 1 above. It was found that about 2 wt % of hydrogen can be absorbed.

Desorption was performed by evacuating the PCI system to 1 kPa (0.01 bar) at a temperature of 200° C. for 5 hours. It was surprisingly found that 90% of the absorbed hydrogen was released under the given conditions.

The material was successively absorbed hydrogen at 150° C. and under 10 MPa (100 bar) of hydrogen for 5 hours. About 1.8 wt % of hydrogen was re-absorbed, which means that about 90 wt % of hydrogen was desorbed at 150° C.

Accordingly, the sorbent of this example was surprisingly found to be capable of reverse absorbing 90 wt % of the absorbed hydrogen at relatively low temperatures of about 150° C.

EXAMPLE 5

$MgH_2$ can be purchased commercially. $Na_2NH$ can be synthesized by reacting Na with ammonia gas $NH_3$.

1.0 gram of $Na_2NH$ and $MgH_2$ with molar ratio of 1:1 was mixed and pretreated following the procedure described in Example 1 to produce a ternary sorbent having the overall general formula of $Na_{0.5}Mg_{0.5}NH_{1.5}$. Without being bound by theory, it is thought that some of the reactants had formed a complex while some of the reactants had not reacted but had remained in admixture form.

500 mg sample of the $Na_{0.5}Mg_{0.5}NH_{1.5}$ sorbent was put into the sample cell of a Pressure-Composition-Isotherm (PCI) unit. The hydrogen storage capacity was determined by introducing 10 MPa (100 bar) of hydrogen into the sample cell, which was preheated to 100° C. After 3 hours of absorption, about 1.5 wt % of hydrogen was absorbed.

Desorption was performed by evacuating the PCI system to 10 kPa (0.1 bar) at a temperature of 150° C. for 3 hours. The amount of desorbed hydrogen was measured by re-absorption of hydrogen at 100° C. and under 10 MPa (100 bar) of hydrogen for 3 hours. About 1.42 wt % of hydrogen was re-absorbed, which means that about 95 wt % of hydrogen was desorbed at 150° C.

Accordingly, the $Na_{0.5}Mg_{0.5}NH_{1.5}$ sorbent was surprisingly found to be capable of reverse absorbing 95 wt % of the absorbed hydrogen. The sorbent of formula $Na_{0.5}Mg_{0.5}NH_{1.5}$ was surprisingly capable of absorbing and desorbing a high quantity of hydrogen at relatively low temperatures of about 100° C.-150° C.

EXAMPLE 6

450 mg sample of $Ca_{0.5}Mg_{0.5}NH$ was put into the sample cell of a Pressure-Composition-Isotherm (PCI) unit. The hydrogen storage capacity was determined by introducing 20 MPa (200 bar) of hydrogen into the sample cell, which was preheated to 40° C. After 2 hours of absorption, about 1.0 wt % of hydrogen was absorbed.

Desorption was performed by evacuating the PCI system to 10 kPa (0.1 bar) at a temperature of 150° C. for 2 hours. The amount of desorbed hydrogen was measured by re-absorption of hydrogen at 20° C. and under 20 MPa (200 bar) of hydrogen for 2 hours. About 0.8 wt % of hydrogen was re-absorbed, which means that about 80 wt % of hydrogen was desorbed at 150° C.

Accordingly, the $Ca_{0.5}Mg_{0.5}NH$ sorbent was surprisingly found to be capable of reverse absorbing 80 wt % of the absorbed hydrogen. The sorbent of formula $Ca_{0.5}Mg_{0.5}NH$ was surprisingly capable of absorbing at relatively low temperature of about 40° C. and of desorbing at a relatively low temperature of 150° C.

Applications

It will be appreciated that the sorbents disclosed in the examples and as described in the embodiments disclosed above were surprisingly found to be capable of reverse absorbing between 80-95 wt % of absorbed hydrogen at relatively low temperatures. As 80-90 wt % of the originally absorbed hydrogen can be released and then reabsorbed (ie reverse absorption), the compounds of the disclosed embodiments have advantageously found to have a relatively high capacity for reverse H absorption. The disclosed compounds not only disclose a compounds capable of absorbing hydrogen at relatively low temperatures and pressures, but compounds that are capable of high levels of reverse absorption. This means that the compounds disclosed herein are capable of exhibiting an overall reverse absorption capacity compared to other known solid-phase hydrogen storage materials.

Advantageously, the disclosed multi-metal compounds may be used in a hydrogen reservoir.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

REFERENCES

1. H. Buchner, P. Pelloux-Gervais, M. Mullar, F. Grafwallner and P. Luger. Hydrogen and other alternative fuels for air and ground transportation. H. W. Pohl, Eds. (John Wiley & Sons, Chichester 1995). Chaps. 7-11.
2. J. Nitsch, W. Peschka, W. Schnurnberger, M. Fischer and H. Eichert. Hydrogen as an energy carrier. C. Winter and J. Nitsch, Eds. (Springer-Verlag. Berlin, 1988), Part B.
3. H. Imamura, N. Sakasai, T. Fujinaga, J AlloyCompd, 253, 34 (1997)
4. A. Zaluska, L. Zaluski, J. O. Strom-Olsen, Appli Phys A, 72, 157 (2001).
5. D. Miklauz, Monatsh, 31, 981 (1910).

The invention claimed is:

1. A multi-metal-nitrogen compound for use in hydrogen storage materials, the compound comprising at least two dissimilar metal atoms and a nitrogen atom, wherein the dissimilar metal atoms are selected to enable the multi-metal-nitrogen compound to reversibly absorb hydrogen at an absorption temperature and pressure, and desorb 60% or more by weight of said absorbed hydrogen at a desorption temperature and pressure.

2. A multi-metal-nitrogen compound as claimed in claim 1, wherein the compound is capable of absorbing and desorbing hydrogen at a temperature of 220° C. or less.

3. A multi-metal-nitrogen compound as claimed in claim 2, wherein the absorption or desorption temperature is in the range of 0° C. to 200° C.

4. A multi-metal-nitrogen compound as claimed in claim 1, wherein the compound is capable of desorbing 80% or more of the absorbed hydrogen.

5. A multi-metal-nitrogen compound as claimed in claim 1, wherein the multimetal-nitrogen compound is a bimetal-nitrogen compound having two dissimilar metals selected from the group consisting of Group IA, Group IIA, Group IIIB, Group IVA and Group VIII of the Periodic Table of elements, and mixtures thereof.

6. A multi-metal-nitrogen compound as claimed in claim 1, wherein the multimetal-nitrogen compound is a bimetal-nitrogen compound having two dissimilar metals selected from the group consisting of aluminium (Al), calcium (Ca), lithium (Li), magnesium (Mg), and sodium (Na).

7. A multi-metal-nitrogen compound as claimed in claim 1, wherein the multimetal-nitrogen compound is a bimetal-nitrogen compound comprising a nitrogen atom and a pair of metal atoms selected from the group consisting of lithium (Li)-aluminium(Al), lithium(Li)-magnesium(Mg), lithium (Li)-calcium(Ca), magnesium(Mg)-calcium(Ca), magnesium(Mg)-sodium(Na), magnesium(Mg)-aluminium(Al), and mixtures thereof.

8. A multi-metal-nitrogen compound as claimed in claim 1, comprising one or two hydrogen atoms bonded to the nitrogen atom.

9. A multi-metal-nitrogen compound as claimed in claim 1, wherein one of the metal atoms is bonded to hydrogen and the other metal atom is bonded to nitrogen.

10. A multi-metal-nitrogen compound as claimed in claim 1, comprising a lithium-aluminium-nitrogen compound selected from the group consisting of lithium-aluminium nitride, lithium-aluminium imide, lithium-aluminium amide, and mixtures thereof.

11. A multi-metal-nitrogen compound as claimed in claim 1, comprising a lithium(Li)-aluminium(Al)-nitrogen(N) compound represented by the general formula:

$$Li_XAl_YNH_N$$

where $0<X<3$, $0<Y<1$ and $N \geq |3-X-3Y|$.

12. A multi-metal-nitrogen compound as claimed in claim 1, comprising a bimetal-nitrogen compound selected from the group consisting of lithium-magnesium-nitride, lithium-magnesium-imide, lithium-magnesium-amide, lithium-calcium-nitride, lithium-calcium-imide, lithium-calcium-amide, and mixtures thereof.

13. A multi-metal-nitrogen compound as claimed in claim 1, comprising a lithium(Li)-magnesium(Mg)-nitrogen(N) compound represented by the general formula:

$$Li_XMg_YNH_N$$

where $0<X<3$, $0<Y<1.5$ and $N \geq |3-X-2Y|$.

14. A multi-metal-nitrogen compound as claimed in claim 1, comprising a lithium(Li)-calcium(Ca)-nitrogen(N) compound represented by the general formula:

$$Li_XCa_YNH_N$$

where $0<X<3$, $0<Y<1.5$ and $N \geq |3-X-2Y|$.

15. A multi-metal-nitrogen compound as claimed in claim 1, comprising a bimetal-nitrogen compound selected from the group consisting of magnesium-calcium nitride, magnesium-calcium imide, magnesium-calcium amide, and mixtures thereof.

16. A multi-metal-nitrogen compound as claimed in claim 1, comprising a magnesium(Mg)-calcium(Ca)-nitrogen(N) compound represented by the general formula:

$$Mg_XCa_YNH_N$$

where $0<X<1.5$, $0<Y<1.5$ and $N \geq |3-2x-2y|$.

17. A multi-metal-nitrogen compound as claimed in claim 1, comprising a bimetal-nitrogen compound selected from the group consisting of magnesium-sodium nitride, magnesium-sodium imide, magnesium-sodium amide, and mixtures thereof.

18. A multi-metal-nitrogen compound as claimed in claim 1, comprising a magnesium(Mg)-sodium(Na)-nitrogen(N) compound represented by the general formula:

$$Mg_XNa_YNH_N$$

where $0<X<1.5$, $0<Y<1.5$ and $N \geq |3-2x-2y|$.

19. A multi-metal-nitrogen compound as claimed in claim 1, comprising a bimetal-nitrogen compound selected from the group consisting of magnesium-aluminium nitride, magnesium-aluminium imide, magnesium-aluminium amide, and mixtures thereof.

20. A multi-metal-nitrogen compound as claimed in claim 1, comprising a magnesium(Mg)-aluminium(Al)-nitrogen (N) compound represented by the general formula:

$$Mg_XAl_YNH_N$$

where $0<X<1.5$, $0<Y<1.5$ and $N \geq |3-2x-2y|$.

21. A hydrogen reservoir containing a multi-metal-nitrogen compound as claimed in claim 1.

22. A process for reverse adsorbing hydrogen comprising:
contacting the multi-metal-nitrogen compound of claim 1 with hydrogen at an absorption temperature and pressure; and
releasing hydrogen from the multi-metal-nitrogen compound at a desorption temperature and pressure.

23. A process for making a multi-metal-nitrogen compound for use in a hydrogen reservoir, the process comprising the step of heating a metal hydride comprising at least one metal and a metal-nitrogen compound comprising at least one metal that is dissimilar to said at least one metal of said metal hydride, at a temperature and a pressure to form the multi-metal-nitrogen compound, the dissimilar metals being selected to enable the multi-metal-nitrogen compound is to reversibly absorb hydrogen at an absorption temperature and pressure, and desorb 60% or more by weight of said absorbed hydrogen at a desorption temperature and pressure.

24. Use of a multi-metal-nitrogen compound as claimed in claim 1 for storing hydrogen.

* * * * *